United States Patent [19]

Jacobs et al.

[11] Patent Number: 5,339,440
[45] Date of Patent: Aug. 16, 1994

[54] WAIT STATE MECHANISM FOR A HIGH SPEED BUS WHICH ALLOWS THE BUS TO CONTINUE RUNNING A PRESET NUMBER OF CYCLES AFTER A BUS WAIT IS REQUESTED

[75] Inventors: Edward M. Jacobs, Mt. View; Kenneth K. Chan, San Jose; Thomas B. Alexander, Santa Clara, all of Calif.

[73] Assignee: Hewlett-Packard Co., Palo Alto, Calif.

[21] Appl. No.: 933,434

[22] Filed: Aug. 21, 1992

[51] Int. Cl.⁵ .......................................... G06F 13/38
[52] U.S. Cl. ................................ 395/325; 364/260; 364/240; 364/240.2; 364/271.5; 364/240.5; 364/DIG. 1
[58] Field of Search ................ 395/325, 275, 725, 425; 370/85.1, 94.1; 340/825.5

[56] References Cited

U.S. PATENT DOCUMENTS

| | | | |
|---|---|---|---|
| 3,781,478 | 12/1973 | Blahut et al. | 370/85.15 |
| 4,281,380 | 7/1981 | DeMesa, III et al. | 364/200 |
| 4,445,214 | 4/1984 | Reynolds et al. | 370/85.9 |
| 4,517,670 | 5/1985 | Ulug | 370/85 |
| 4,535,404 | 8/1985 | Shenk | 364/200 |
| 4,807,109 | 2/1989 | Farrell et al. | 395/325 |
| 4,845,522 | 7/1989 | Kataoka | 354/412 |
| 4,891,835 | 1/1990 | Leung et al. | 379/88 |
| 5,020,020 | 5/1991 | Pomfret et al. | 364/900 |
| 5,070,473 | 12/1991 | Takano et al. | 395/725 |
| 5,101,347 | 3/1992 | Balakrishnan et al. | 395/800 |
| 5,151,979 | 9/1992 | Porskitt | 395/325 |
| 5,155,812 | 10/1992 | Ehlig et al. | 395/275 |
| 5,201,036 | 4/1993 | Yoshimatsu | 395/325 |
| 5,247,654 | 9/1993 | Hamid et al. | 395/550 |
| 5,253,355 | 10/1993 | Grieff | 395/425 |

FOREIGN PATENT DOCUMENTS

| | | | |
|---|---|---|---|
| 364849 | 10/1989 | European Pat. Off. | G06F 13/42 |
| 378427 | 1/1990 | European Pat. Off. | G06F 13/42 |

OTHER PUBLICATIONS

IBM Technical Dis. Bulletin, vol. 25, #7A, Dec. 1982, NY, US 'Wait State Generator'.

*Primary Examiner*—Gopal C. Ray
*Attorney, Agent, or Firm*—Roland I. Griffin; Alan H. Haggard; Howard R. Boyle

[57] ABSTRACT

The present invention provides a protocol method for waiting the bus in a digital computer and an apparatus for implementing that protocol. By allowing the bus to continue running after a wait command has been asserted, modules on the computer bus are not required to respond instantly to the wait command. Information on the bus during the multiple cycles of the wait period is defined as invalid and valid data is driven on the bus after the wait period has expired. Bus driver modules are provided with a replay queue to replay, on the bus, data the driver module drove on the bus during the wait period if required.

6 Claims, 17 Drawing Sheets

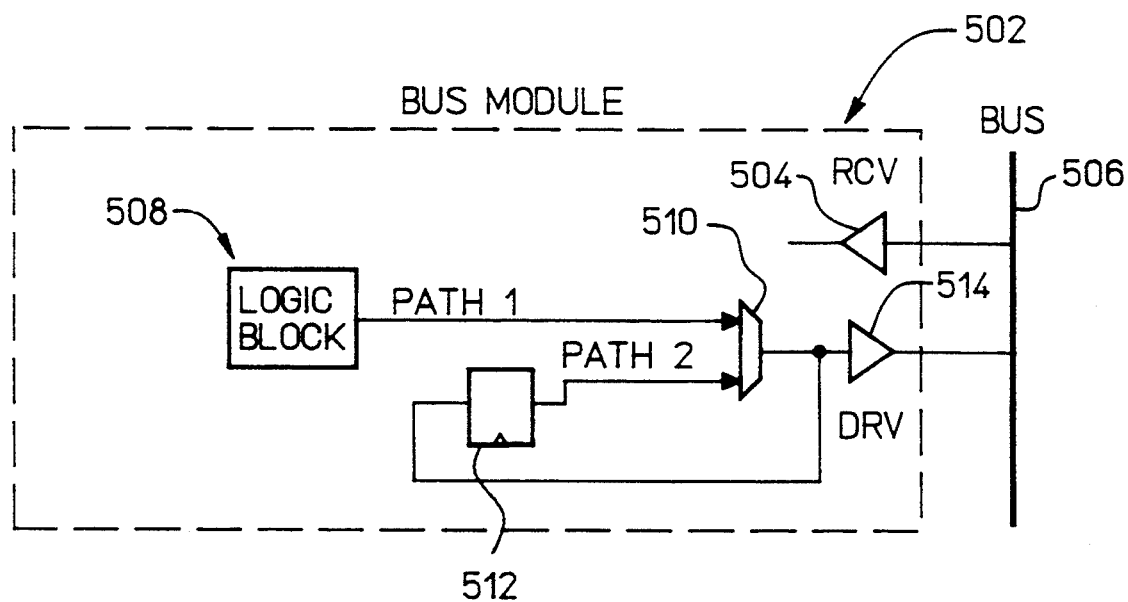
FIG 5A
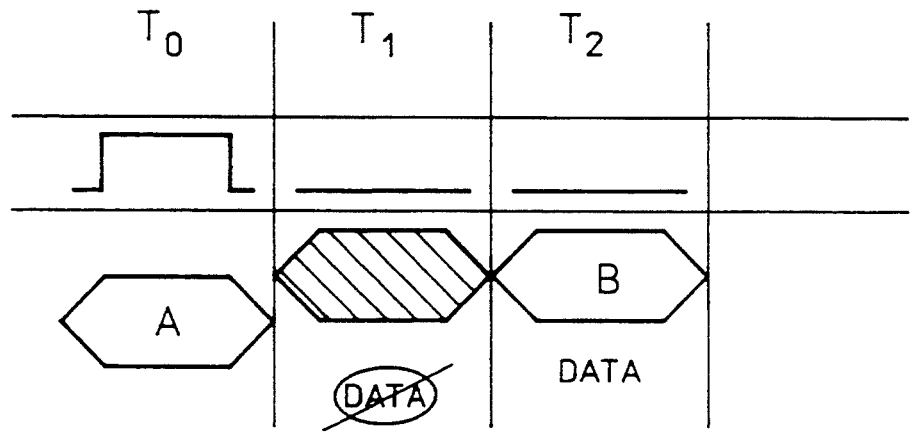
FIG 5B
| TIME | T0 | T1 | T2 |
|---|---|---|---|
| WAIT | 1 | 0 | 0 |
| BUS CASE1 | A | PATH 1 B | PATH 2 B |
| BUS CASE2 | A | PATH 1 ? | PATH 1 B |
FIG 5C

| TIME | T0 | T1 | T2 | T3 | T4 | T5 | T6 | T7 | T8 | T9 | T10 |
|---|---|---|---|---|---|---|---|---|---|---|---|
| WAIT | 1 | 0 | 0 | 0 | 0 | 0 | 0 | 0 | 0 | 0 | 0 |
| BUS CASE1 | Z | A | B | C | D | A | B | C | D | E | F |
| BUS CASE2 | Z | ? | ? | ? | ? | A | B | C | D | E | F |

CASE 1: MODULE OTHER THAN THE DRIVER ASSERTS WAIT
CASE 2: DRIVER ASSERTS WAIT

WAIT STATE MECHANISM FOR A HIGH SPEED BUS WHICH ALLOWS THE BUS TO CONTINUE RUNNING A PRESET NUMBER OF CYCLES AFTER A BUS WAIT IS REQUESTED

BACKGROUND OF THE INVENTION

The present invention relates to the field of digital computers. In particular, the present invention provides a method and apparatus for waiting the bus in a digital computer to allow a slow bus module to respond to bus signals and data.

Digital computers typically consist of a central processing unit (CPU) module, a memory module, a disk controller module and other input and output modules all connected together by one or more busses. FIG. 1 shows a simplified computer system utilizing multiple bus modules connected to a bus. The modules communicate with each other over the bus with the communication consisting of the transfer of address, data and status signals.

For the computer modules to communicate with each other, each must adhere to the protocol of the bus. This protocol consists of timing and electrical specifications which determine how the bus is used. Included in the bus protocol is a wait mechanism that allows a module to "wait" the bus. A wait mechanism is required because a bus module cannot always provide or accept data at the normal timing specified by the bus protocol. Events such as memory refresh, or a delay in obtaining cache coherehey check results in a multiprocessor system are common reasons to wait a bus. By asserting a wait signal, a bus module can effectively stop the transfer of valid data on the bus until the module can continue with the bus transaction.

In the discussion below the terms "good data", "bad data", "valid data" and "invalid data" are used. "Good data" refers to data that is correct while "bad data" refers to data that is incorrect. An example of bad data would be a data word with one or more bits incorrect because the driver was unable to supply the proper bits during the current bus cycle. "Valid data" is data that is both good and present on the bus during a time the bus protocol allows the data to be used. "Invalid data" is data that is either bad or data that is good but present on the bus at a time the bus protocol does not allow the data to be used.

Also, a driver module refers to a module that is driving address, data or status signals on the bus. A receiver module is a module that receives the address, data or status signals driven on the bus by the driver module.

Shown in FIGS. 2A and 2B are the timing diagrams of a prior art bus without a wait state and with a wait state respectively. In FIG. 2A, a wait command is not asserted by a module therefore the data represented by "DATA" is not delayed and is valid during the $T_1$ bus cycle. In FIG. 2B a bus module has asserted a bus wait command and the data on the bus during the $T_1$ bus cycle is invalid. Data on the bus will continue to be invalid until the wait command is released by the asserting bus module. When the wait command is released, valid data will be driven onto the bus during the bus cycle immediately following the release of the wait command. In the example shown in FIG. 2B, valid data is driven onto the bus during the $T_2$ bus cycle. If the driver module needed to wait the bus, then the data available on the bus during the $T_1$ bus cycle would not be good data as the driver did not have the data available. However, if a receiver module waited the bus, then the data available during the $T_1$ bus cycle may be good data but considered invalid data by protocol definition. The driver module would drive good data onto the bus during the $T_1$ bus cycle and hold the same good data on the bus through the $T_2$ bus cycle.

One problem with the prior art bus protocol and wait mechanism is a module must recognize a wait command has been asserted and respond almost instantly. As shown in FIG. 2B, a module must recognize the wait command was asserted during the $T_1$ bus cycle and respond appropriately during the start of the $T_2$ bus cycle. This response time was sufficient when computers operated at 8 megahertz (MHZ). Today, with computers operating at 50+ MHZ, a protocol requiring the bus modules to recognize a wait command and respond at the start of the next bus cycle is not practical due to speed limitations of the integrated circuits used by the modules.

To increase the time a module has to respond to a wait command, a protocol shown in FIG. 2C can be used. This protocol requires a bus module to assert a wait command one bus cycle before the bus cycle to be waited. As shown in FIG. 2C, the wait command is asserted during $T_0$ and therefore the data on the bus during bus cycle $T_1$ is invalid. During bus cycle $T_2$ the data on the bus is valid. While this protocol allows more time for modules on the bus to respond to a wait command, the extra time still may not be sufficient. Also, there is a performance cost to increasing the response time by forcing a module to assert a wait command earlier than $T_0$ (for example assert wait as $T_1$) as the module asserting wait may not definitely know a wait is needed earlier than $T_0$. If a module asserts a wait when it is not needed, a bus cycle is wasted and the performance of the computer is degraded.

Therefore, what is needed in the industry is a protocol method and apparatus for waiting a bus without needlessly degrading the performance of the computer and while allowing modules on the bus sufficient time to recognize and respond to the wait command.

SUMMARY OF THE INVENTION

The present invention provides a protocol method and apparatus for waiting the bus in a high speed computer. This new and novel method and apparatus provides each module on the bus sufficient time to recognize and respond to a wait command without requiring a module to determine, far in advance of the bus cycle to be waited, that a wait will be required.

In a preferred wait protocol method, a bus wait command is asserted one cycle before the bus cycle to be waited thereby preventing unnecessary invalid cycles. The wait protocol method defines the N bus cycles immediately following the wait command as invalid but also further defines that during these N cycles, the bus advances despite the wait rather than freeze at the first invalid cycle. Therefore bus modules have until after the N waited cycles to respond to a wait command.

In a preferred embodiment of the present invention, an apparatus is provided incorporating a replay queue. This replay queue stores the last N bus cycles and, if required, replays on the bus the N cycles after a bus wait command is terminated.

In another preferred embodiment of the present invention, a driver bus module incorporates a replay queue to replay the last N bus cycles generated by the driver module. If required, the driver module replays on the bus all N cycles or a subset of the N cycles the driver module previously generated and drove onto the bus during a time the bus was waited.

BRIEF DESCRIPTION OF THE DRAWINGS

FIG. 5A shows a bus module utilizing a single data word replay queue.

FIG. 5B shows a timing diagram for a bus connected to the module shown in FIG. 5A.

FIG. 5C is a chart of the data the bus module shown in FIG. 5A drives on the bus.

DETAILED DESCRIPTION OF THE INVENTION

Figure 1:
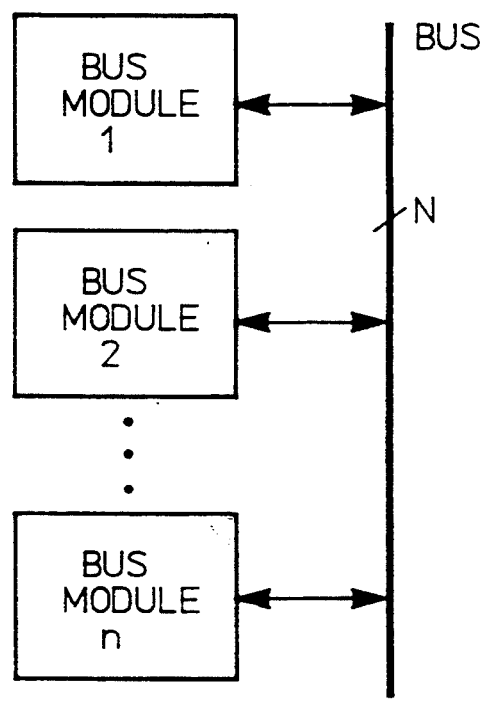
FIG. 1 shows a simplified computer system utilizing multiple bus modules.
Figure 2A:
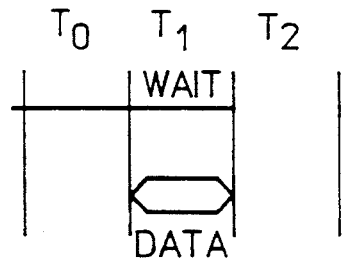
FIG. 2A shows a prior art bus timing diagram with no wait command asserted.
Figure 2B:
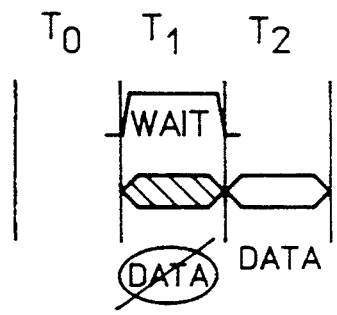
FIG. 2B shows a prior art bus timing diagram with a wait command asserted.
Figure 2C:
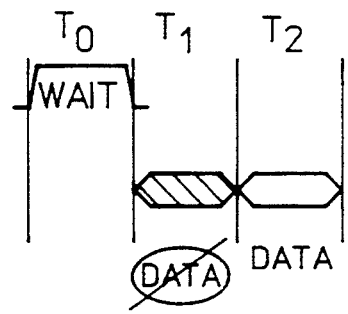
FIG. 2C shows a bus timing diagram where a wait command is asserted one cycle before the bus cycle to be waited.
Figure 3:
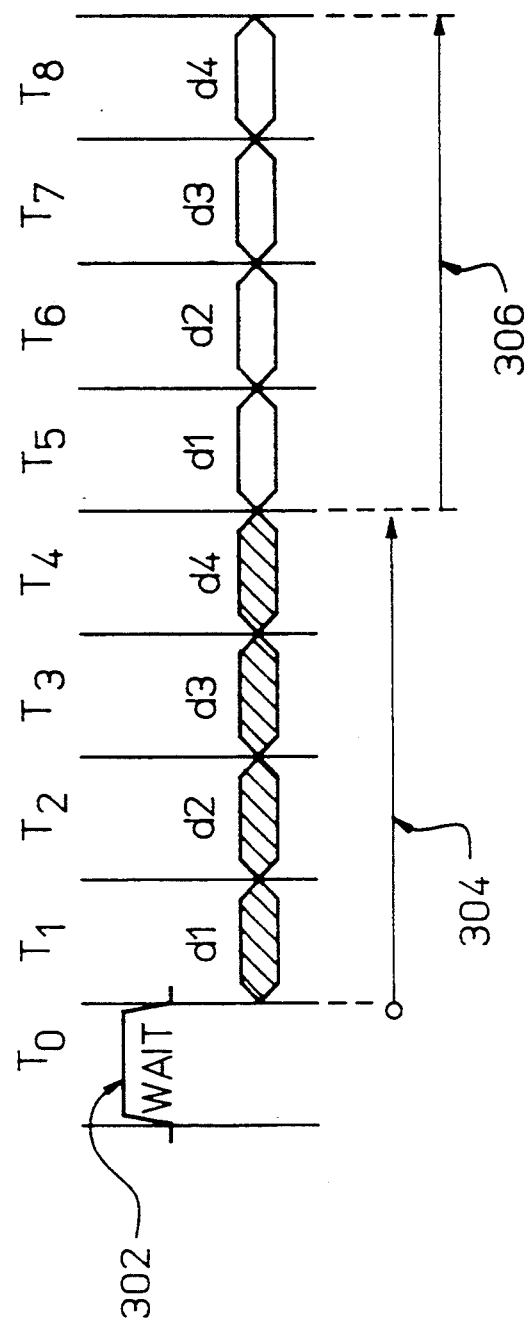
FIG. 3 shows a bus timing diagram of a bus using the wait protocol method of the present invention.

FIG. 3 shows an exemplary timing diagram of a bus utilizing the method and apparatus of the present invention. As shown, a wait command 302 is asserted during bus cycle $T_0$ by a bus module (not shown). In this example, four bus cycles, $T_1$-$T_4$, are waited as a result of the wait command being asserted. The data words d1-d4 present on the bus during the wait period are invalid by protocol definition. During bus cycles $T_5$-$T_8$, the data words d1-d4 are replayed on the bus by a driving bus module and the data words are valid. A receiving bus module (not shown) discards or ignores the data from the $T_1$-$T_4$ bus cycles and uses the data from the $T_5$-$T_8$ bus cycles.

This novel wait protocol method allows a bus module to delay asserting a wait command until the bus cycle just before the bus cycle to be waited thereby avoiding needless wait cycles. Also, all bus modules have four bus cycles to recognize and respond to the wait command. The illustrated wait period 304 of four cycles was chosen based on a specific hardware design but other wait periods are advantageously used. For example, if the bus modules required longer than four bus cycles to recognize and respond to a wait command, the wait period 304 could be extended by increasing the number of data words 306 replayed. To reduce the number of bus cycles waited, the protocol is modifiable to require a bus module to assert a wait command earlier than one cycle before the first waited bus cycle.

Figure 4:
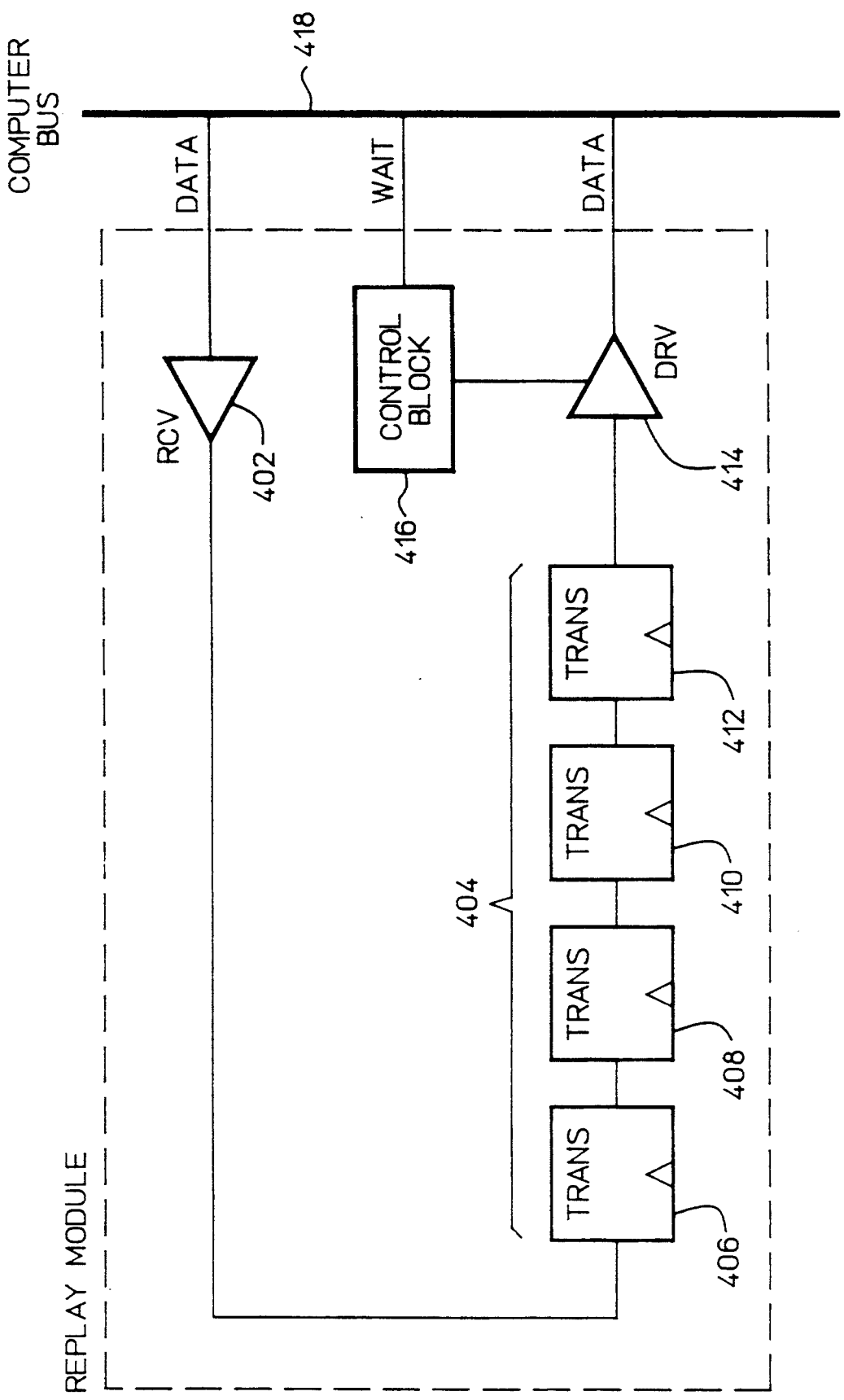
FIG. 4 shows a simplified replay module according to the present invention.

FIG. 4 shows a simplified diagram of a replay module that implements the bus wait protocol method shown in FIG. 3. The replay module incorporates a data receiver 402, having an output connected to a replay queue 404 consisting of four data storage blocks 406, 408, 410, and 412 connected in series. A driver 414 is connected to an output from the last data storage block 412 in the queue 404. A control block 416 is connected to, and controls, the driver 414.

In operation, the last four cycles on the computer bus 418 are stored in the replay queue 404. The control block 416 recognizes a wait command has been asserted on the bus 418 and enables the driver 414 to drive onto the bus, starting on the cycle immediately following the last bus cycle of the wait period, the last four bus cycles. A computer system would only need one replay block.

FIG. 5A shows a preferred diagram of the present invention. In this simplified embodiment, a driver bus module 502 incorporates a bus data receiver 504 connected to the computer bus 506 and to internal logic circuits (not shown) of the module. An internal logic block 508 has an output, path 1, connected to an input of a multiplexer 510. A second input of the multiplexer 510 is connected to an output, path 2, of a data storage block 5 12. The output of the multiplexer 5 10 is connected to an input of the data storage block 512 and to the input of a bus data driver 514.

FIG. 5B shows a simplified bus timing diagram for a bus connected to the bus module shown in FIG. 5A. In this timing diagram, a module other than 502 drove data word "A" onto the bus during bus cycle $T_0$ and module 502 was scheduled to drive data word "B" onto the bus during bus cycle $T_1$. As shown, a wait command was asserted during the $T_0$ bus cycle. Therefore the data present on the bus during the $T_1$ bus cycle was invalid by protocol definition. During the $T_2$ bus cycle, module 502 drove data word "B" onto the bus.

FIG. 5C is a chart detailing the internal operation of the module shown in FIG. 5A during the $T_0$-$T_2$ bus cycles shown above. This chart illustrates two cases. In case 1, bus module 502 did not assert the wait command during bus cycle $T_0$. Therefore module 502 had the data word "B" available to drive on the bus during cycle $T_1$. During cycle $T_1$, logic block 508 used path 1 to drive data word "B" onto the bus through the multiplexer 510 and the driver 514. Data word "B" was also stored in the data storage block 512. During $T_2$, the data storage block 512 used path 2 to drive data word "B" onto the bus through the multiplexer 510 and the driver 514. So in case 1, the bus contained data word "A" at $T_0$, data word "B" (invalid) at $T_1$ and data word "B" (valid) at $T_2$. In this example, the bus modules would have to recognize and respond to a wait command within one bus cycle as there is only one data storage block. A one cycle response time may not be practical in a high speed computer and this example is intended only as an illustration of the basic theory of operation of the present invention.

In case 2, bus module 502 did not have data word "B" available to drive onto the bus during bus cycle $T_1$ and therefore asserted a wait command during bus cycle $T_0$. During $T_1$, logic block 508 used path 1 to drive bad data onto the bus. During $T_2$, the logic block 508 used path 1 again to drive data word "B" onto the bus 506 and the replay queue was not used by the driving module. So, in this case, the bus contained data word "A" at $T_0$, bad data at $T_1$ and data word "B" at $T_2$. In both cases 1 and 2 a receiving bus module (not shown) would have to ignore or discard the data on the bus during bus cycle $T_1$, and use the data on the bus during bus cycle $T_2$.

Figures 6A, 6B:
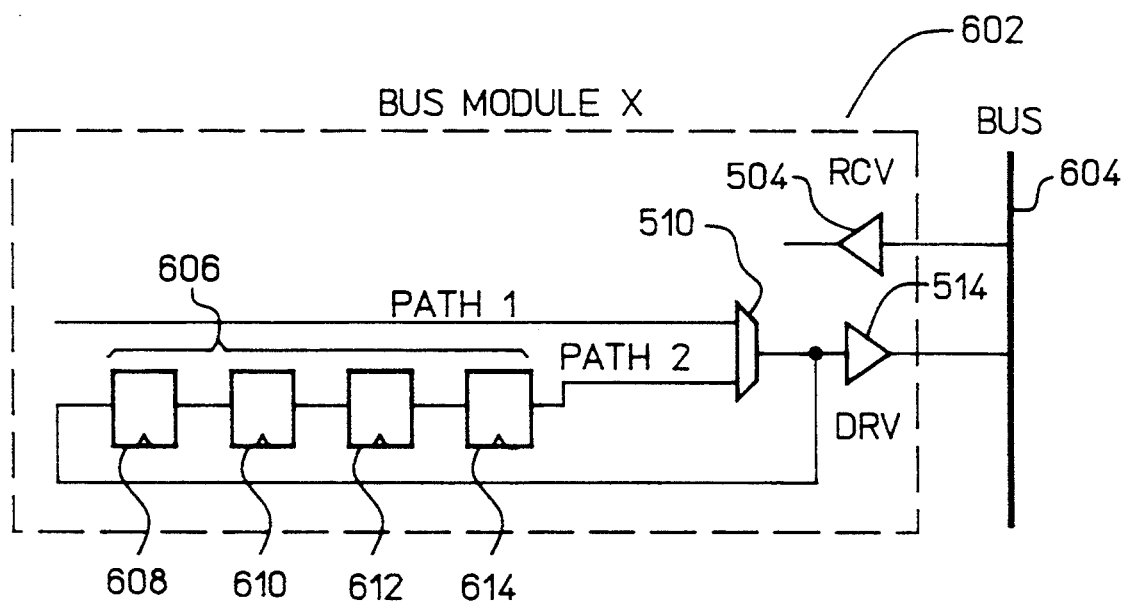
FIG. 6A is a block diagram of a bus module incorporating a four data word replay queue.
FIG. 6B is a chart of the data the bus module shown in FIG. 6A drives on the bus in concert with other bus modules.

FIG. 6A shows a simplified bus module according to the present invention incorporating four data storage blocks. As shown, bus module 602 contains a bus receiver 504 which connects logic internal to the module (not shown) to the bus 604. A replay queue 606 consists of four data storage blocks 608, 610, 612 and 614 connected in series. The input of storage block 608 connects to the output of the multiplexer 510. The output of storage block 614 is connected to one input of the multiplexer 510. A bus driver 514 has an input connected to the output of the multiplexer 510 and the output of the driver 514 is connected to the bus 604. The operation of the bus module 602 is essentially the same as for the bus module 502 described above. However, bus module 602 can store and replay four data words whereas bus module 502 could only store a single data word. The additional storage ability allows the bus modules sufficient time to respond to a bus wait command as required in a high speed computer.

FIG. 6B is a simplified timing chart of a bus connected to the bus module 602. "Z" represents a data word driven onto the bus by a driver module scheduled to drive the bus immediately before module 602. "E" and "F" represent data words driven on the bus by a driver module scheduled to drive the bus immediately after module 602. Module 602 is scheduled to drive data words "A–D" on the bus starting at bus cycle $T_1$. In case 1, a module other than 602 asserted a wait command during bus cycle $T_0$, Therefore the data, "A–D" driven on the bus by module 602 during bus cycles $T_1$–$T_4$, is good data but invalid by protocol definition. The replay queue 606 replays data words "A–D" onto the bus during bus cycles $T_5$–$T_8$.

In case 2, module 602 will not have data words "A–D" available by bus cycle $T_1$ and therefore asserts a wait command on the bus during bus cycle $T_0$. Module 602 drives bad data onto the bus during bus cycles $T_1$–$T_4$ and then drives data words "A–D" onto the bus during bus cycles $T_5$–$T_8$. In case 2, the relay queue 606 is not utilized.

Figure 7:
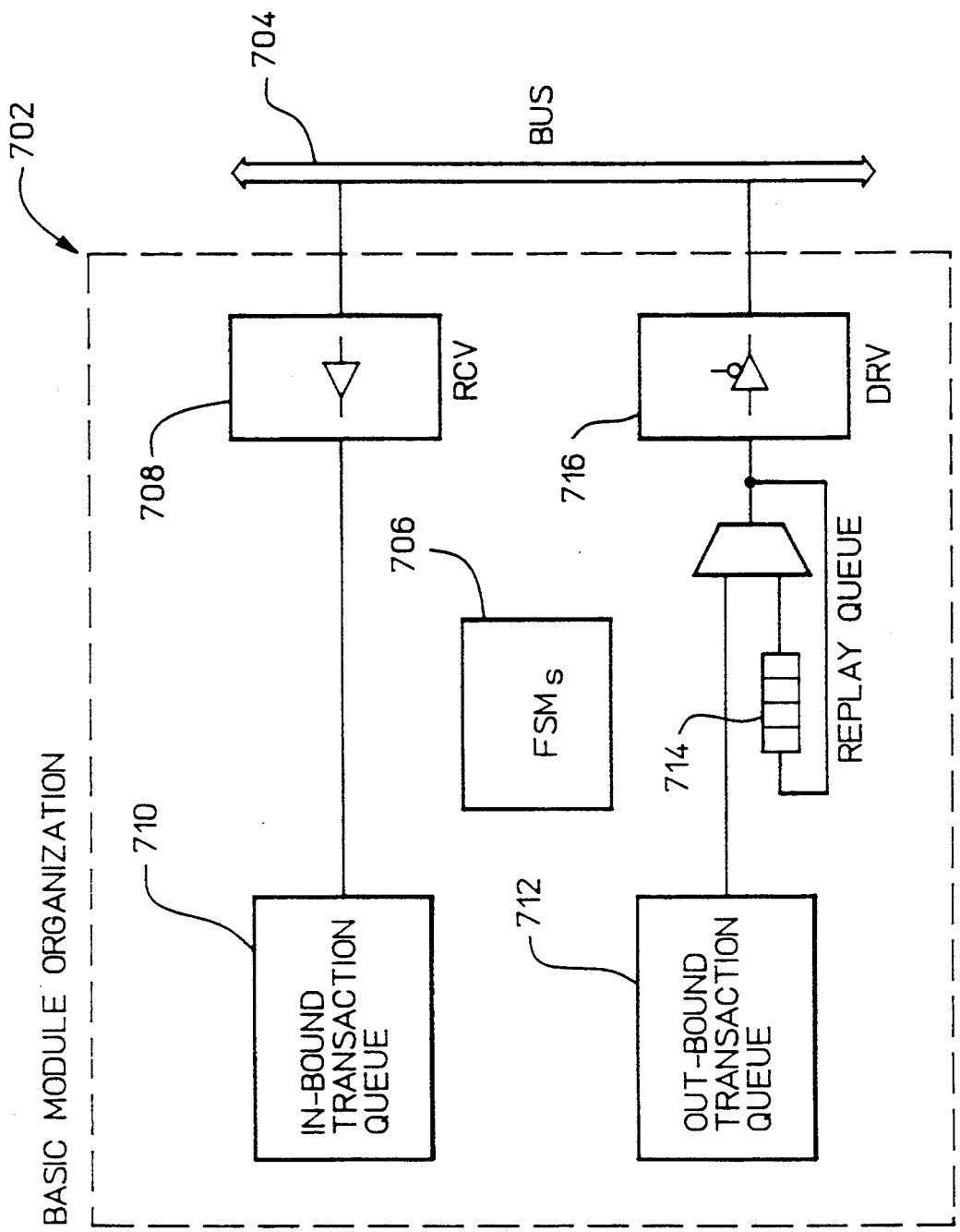
FIG. 7 is a block diagram of a bus module.

FIG. 7 shows a basic bus module 702 connected to a bus 704. A set of finite state machines (FSM) 706 controls the module 702. The FSMs 706 observe the information received from the bus 704 by the receiver block 708 and store the information in the in-bound transaction queue 710. If the FSMs 706 need to send a transaction onto the bus 704, the FSMs 706 store the transaction in the out-bound transaction queue 712. After the bus module 702 wins bus arbitration (not shown), the transaction is sent from the out-bound transaction queue 712 to the driver block 716. Also, the out-bound transaction is loaded into the replay queue 714. The drivers 716 drive the transaction onto the bus 704. Replay queue 714 is controlled by one of the FSMs 706 which upon detecting a wait has been asserted on the bus 704, halts the appropriate FSMs 706 and decides whether to send N states from the out-bound transaction queue 712 or the replay queue 714 to the bus 704.

Figure 8:
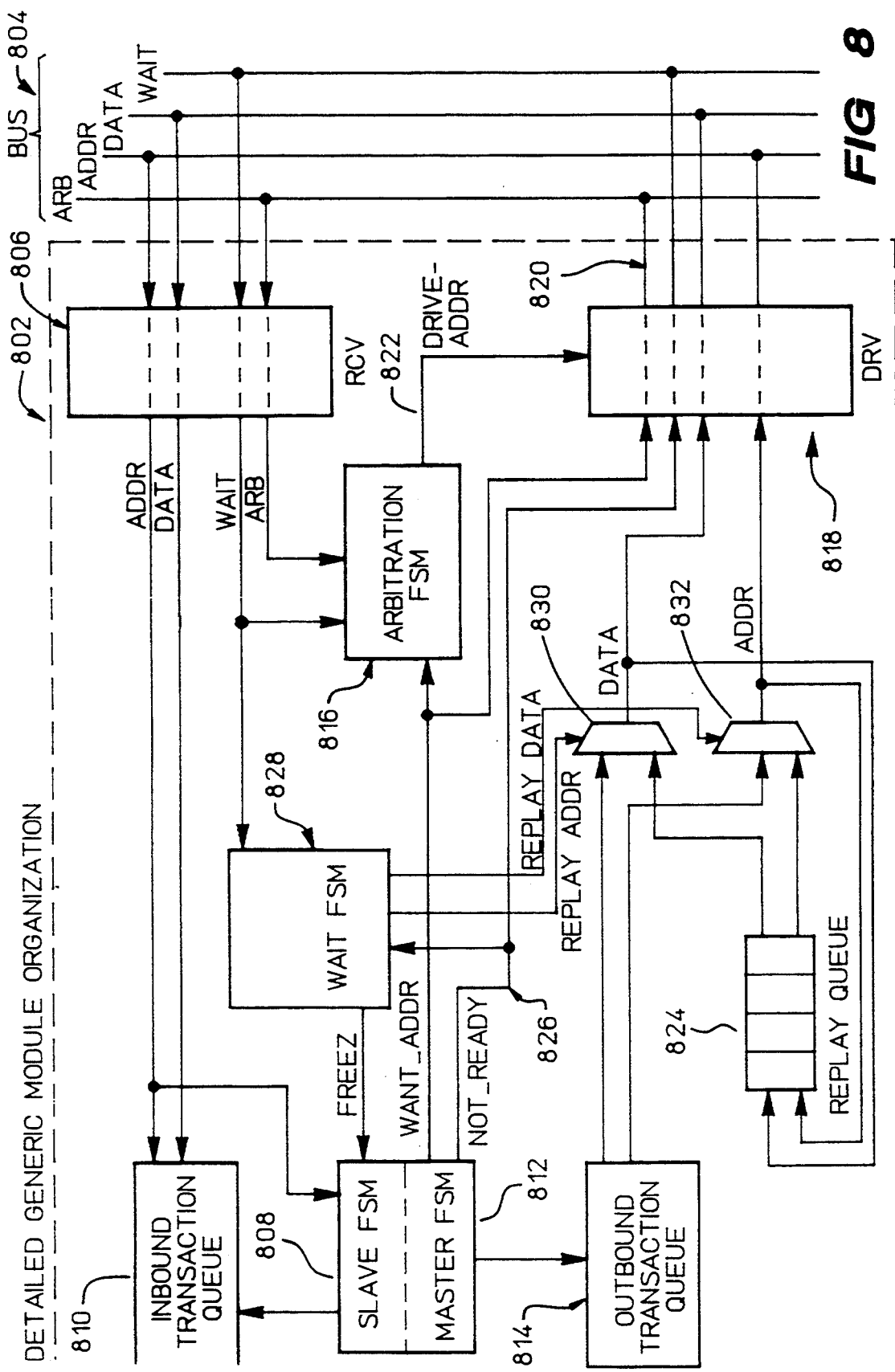
FIG. 8 shows a detailed block diagram of a bus module.

FIG. 8 shows a detailed block diagram of a bus module 802 according to the present invention. Bus 804 is shown comprised of arbitration, address, data and wait signals. A receiver block 806 buffers and latches data from the bus 804 and provides that data to logic circuitry internal to the module 802. A slave FSM 808 receives addresses from the receiver block 806 and stores address and data of pertinent transactions into the in-bound transaction queue 810.

A master FSM 812 controls an out-bound transaction queue 814. When FSM 812 needs to send a transaction onto the bus 804, FSM 812 sends a want_addr signal to an arbitration FSM 816 and to a driver block 818. The driver block 818 drives the arbitration signal 820 onto the bus. Arbitration FSM 816 observes all the arbitration signals received from the bus 804 and asserts a drive_addr signal 822 when module 802 has won bus arbitration. The drive_addr signal 822 enables the bus drivers 818 to drive the bus 804. When the drive_addr signal is asserted, the master FSM sends the information stored in the out-bound transaction queue 814 through the drivers 818 and onto the bus. If the master FSM is not ready to send a particular cycle of address or data out to the bus, the FSM asserts a not_ready signal 826. This not_ready signal is sent through the driver 818 and onto the bus 804 and the signal is sent to a wait FSM 828. Upon receipt of a wait command from the bus 804, the wait FSM 828 freezes all FSMs except for a master FSM asserting not_ready. The wait FSM also causes the appropriate part of the replay queue to resend the bus-bound signals from N states ago. The FSM asserting not_ready is not frozen and therefore can send bus-bound signals, controlled by that FSM, to the bus. As such, there may be two or more multiplexors, 830 and 832, at the head of the replay queue controlling different subsets of the out-bound bus data.

Figure 9:
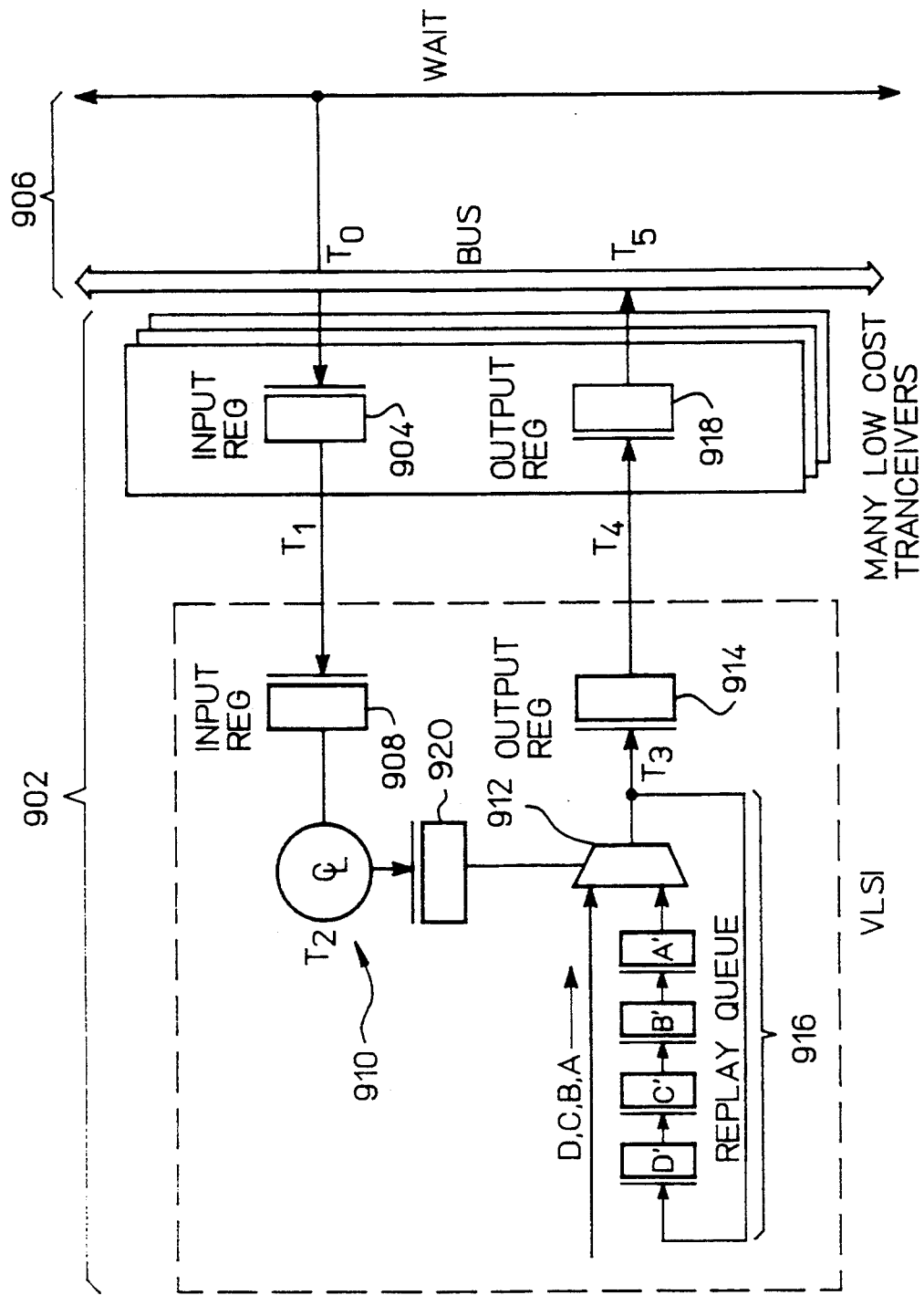
FIG. 9 is a block diagram of a bus module detailing the wait latency.

FIG. 9 shows a block diagram of a bus module 902 illustrating why a preferred embodiment of the present invention utilizes a bus wait period of four bus cycle. While the bus wait period may be any number of bus cycles, the design of the bus modules determines the most advantageous number of bus cycles to be used for a wait period.

As shown in FIG. 9, the bus module 902 includes a first input register 904 connected between the bus 906 and a second input register 908. The output from register 908 is connected to a control logic block 910 which in turn controls a multiplexer 912. An output from the multiplexor 912 is connected to the input of an output register 914 and to the input of a replay queue 916. The output from register 914 is connected to the input of a second output register 918 and the output of the register 918 is connected to the bus 906. Two inputs are provided on the multiplexor 912 one of which is connected to an out-bound transaction queue (not shown) and the other input is connected to the output of the replay queue 916.

When a wait command is asserted during bus cycle $T_0$, it is available to the input of the second input register 908 during $T_1$. Control block 910 responds to the wait command and sets up the multiplexer select in a register 920 during $T_2$. The contents of the register 920 selects the replay queue during $T_3$. The output of the replay queue is available at the input of the output register 914 during $T_3$ and to the input of the second output register 918 during $T_4$. Therefore the earliest the replay data can appear on the bus 906 is during the $T_5$ bus cycle. Of course, other bus module designs may need more or less bus cycles depending on the latency in the particular design.

Figure 10:
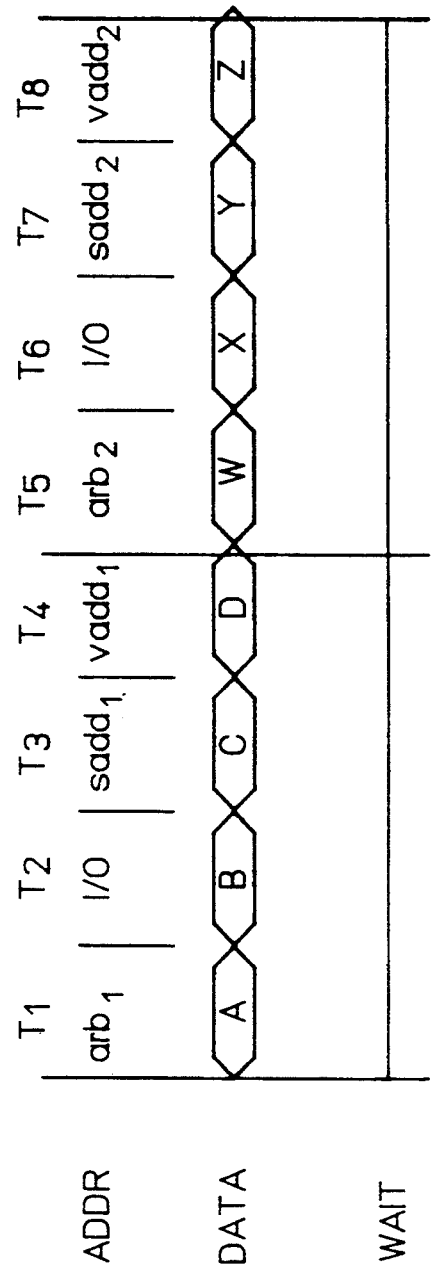
FIG. 10 is a sample bus timing diagram of the present invention.

FIG. 10 shows a simplified bus timing diagram for a bus connected to a bus module shown in FIGS. 8 and 9. The address bus is shown on the top abbreviated as ADDR, the data bus is shown in the middle and the Wait signal is shown at the bottom of the diagram. The buses are independent of each other. That is, the module driving the address bus during a given bus cycle may not be the same module driving the data bus during the same bus cycle. As shown in this diagram, a wait command has not been asserted and therefore both the address and data buses operate without invalid cycles.

During $T_1$, arbitration between the bus modules occurs and data word "A" is driven on the data bus by a first module (not shown). At $T_2$, input/output data not relevant to this discussion occurs on the address bus and data word "B" is driven on the data bus by the first module. During $T_3$ the module that won the arbitration during $T_1$ drives a slave address onto the address bus and the first module drives data word "C" onto the data bus. At $T_4$ a virtual address is driven onto the address bus by the arbitration winner in $T_1$ and the first module drives data word "D" onto the data bus.

During $T_5$ a second arbitration occurs between bus modules and a second module drives data word "W" onto the data bus. During bus cycles $T_6$–$T_8$, the second module continues to drive its data words onto the data bus and the winner of arbitration 2 drives its slave address and virtual address onto the address bus.

Figure 11:
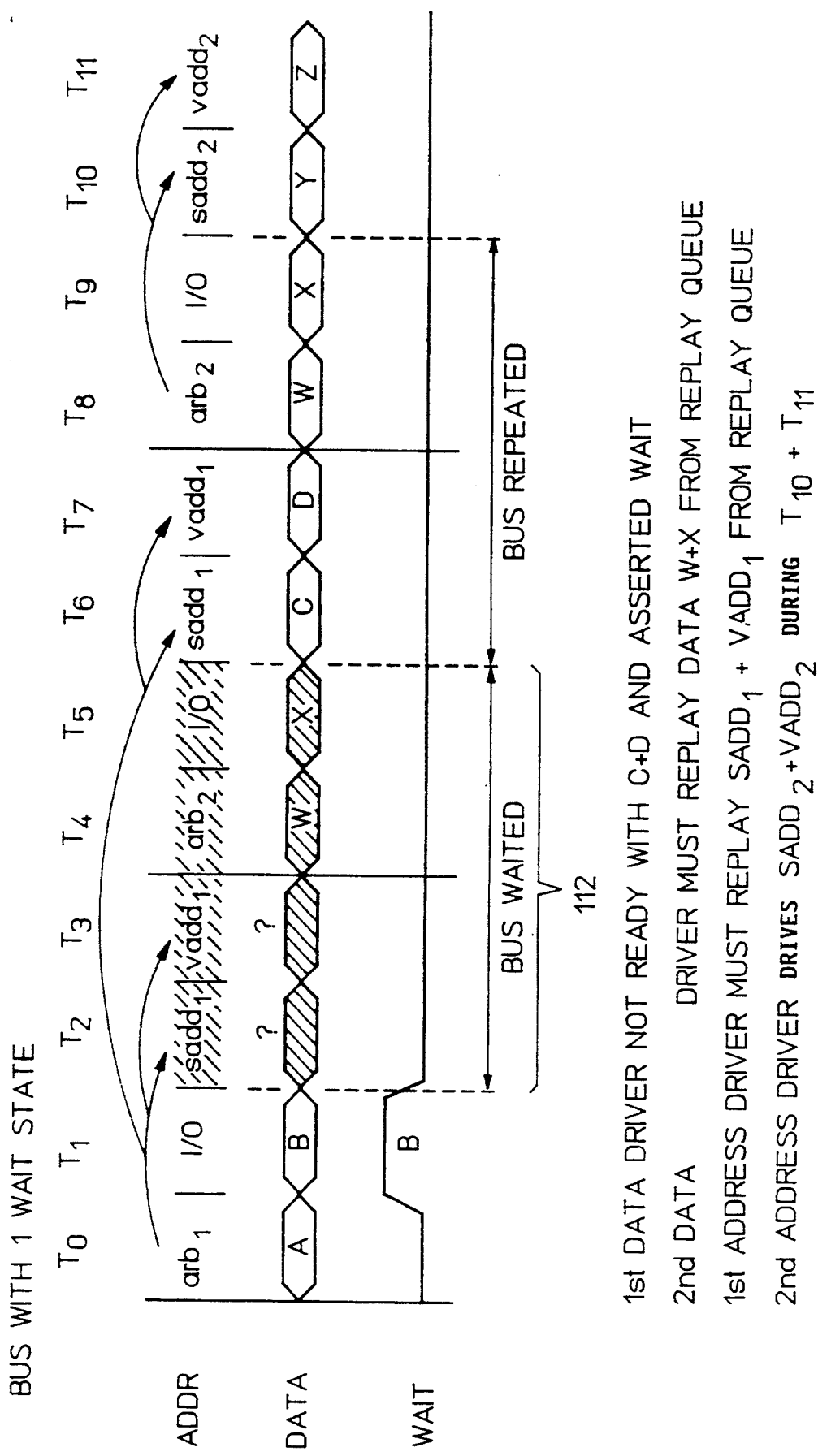
FIG. 11 is a bus timing diagram of the present invention with a wait command asserted.

FIG. 11 shows a bus timing diagram where a single wait command has been asserted. As discussed above, the address and data busses are independent of each other. However, both the address and data busses respond concurrently to a wait command.

In the example shown in FIG. 11, four driver modules are involved. A first address bus driver, which won arbitration in bus cycle $T_0$ later drive slave and virtual address 1 onto the address bus. A second address bus driver which first arbitrates in $T_4$ to drive slave and virtual address 2 onto the address bus. A first data bus driver which drives data words "A–D" onto the data bus and a second data bus driver which drives data words "W –Z" onto the data bus. The first data driver is not ready to send data words "C" and "D" onto the data bus, during $T_2$ and $T_3$ respectively, and therefore asserts a wait command during $T_1$ and drives bad data onto the data bus during $T_2$ and $T_3$. Since the wait command was asserted in the middle of a data quad (a four data word transaction), the second data bus driver will drive good but invalid data words "W" and "X" onto the data bus during $T_4$ and $T_5$. The first data driver module is now ready to drive data words "C" and "D" onto the data bus and does so during $T_6$ and $T_7$. Data words "W" and "X" are replayed onto the data bus during bus cycles $T_8$ and $T_9$ by the second data driver module. In this case, the second data driver module only needed to replay two words onto the bus.

The address bus responds to a wait in a similar manner as the data bus. The first address bus driver won arbitration during $T_0$ and therefore drove slave and virtual address 1 onto the address bus during $T_2$ and $T_3$. Since a wait command was asserted during $T_1$, the information on the address bus during $T_2$ and $T_3$, is not valid and is replayed onto the address bus during $T_6$ and $T_7$ by the first address bus driver. During $T_4$ the second address bus driver won the arbitration but since the arbitration occurred during a wait period 1102, the arbitration is invalid and must be repeated during $T_8$. As the second address driver module won the arbitration during $T_8$, the second address module drives slave and virtual address 2 onto the bus during bus cycles $T_{10}$ and $T_{11}$.

Figure 12:
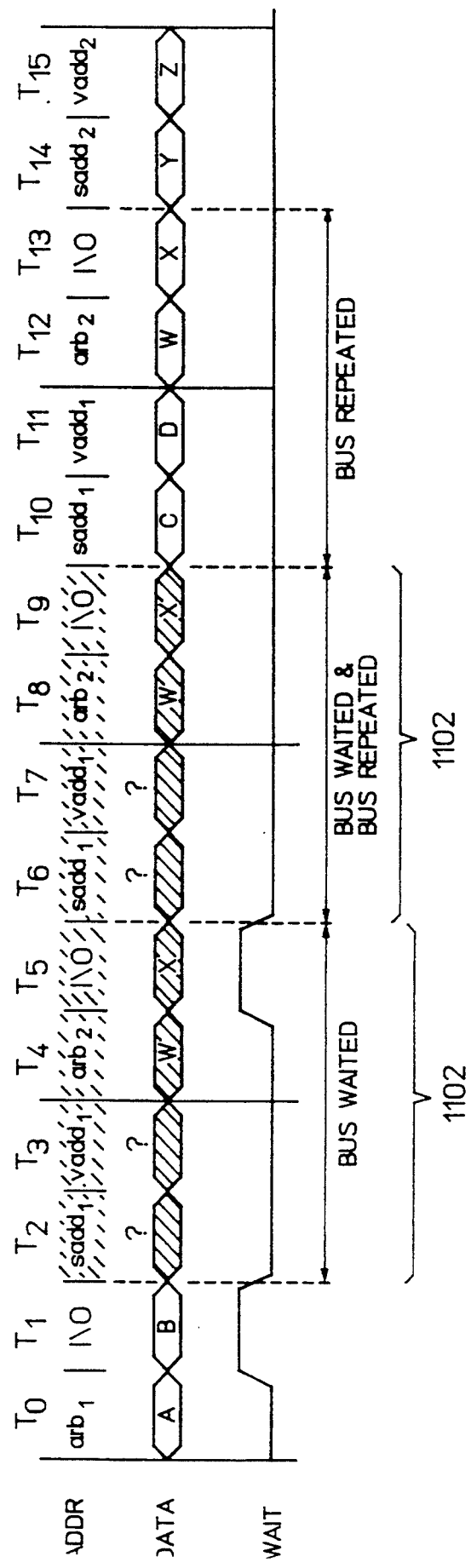
FIG. 12 is a bus timing diagram of the present invention with 2 back-to-back wait commands asserted.

FIG. 12 shows a bus timing diagram where two back-to-back wait states have been asserted. In this example, a wait command has been asserted by the first data bus driver during $T_1$ as in the previous example shown in FIG. 11. However in this present case the first data bus driver asserts an additional wait command during the $T_5$ bus cycle. Therefore instead of data words "C" and "D" being valid during $T_6$ and $T_7$, the data words are not valid until $T_{10}$ and $T_{11}$ respectively. The second data bus driver replays data words "W" and "X" twice, once during the $T_8$ and $T_9$ bus cycles and a second time during the $T_{12}$ and $T_{13}$ bus cycles.

The first address bus driver replays the slave and virtual address 1 onto the bus twice with the address 1 becoming valid during the $T_{10}$ and $T_{11}$. The arbitrations during $T_4$ and $T_8$ are invalid as the arbitrations occurred during bus wait periods 1102. During bus cycle $T_{12}$ the second address bus driver wins the arbitration and drives slave and virtual address 2 on the address bus during the $T_{14}$ and $T_{15}$ bus cycles.

Figure 13:
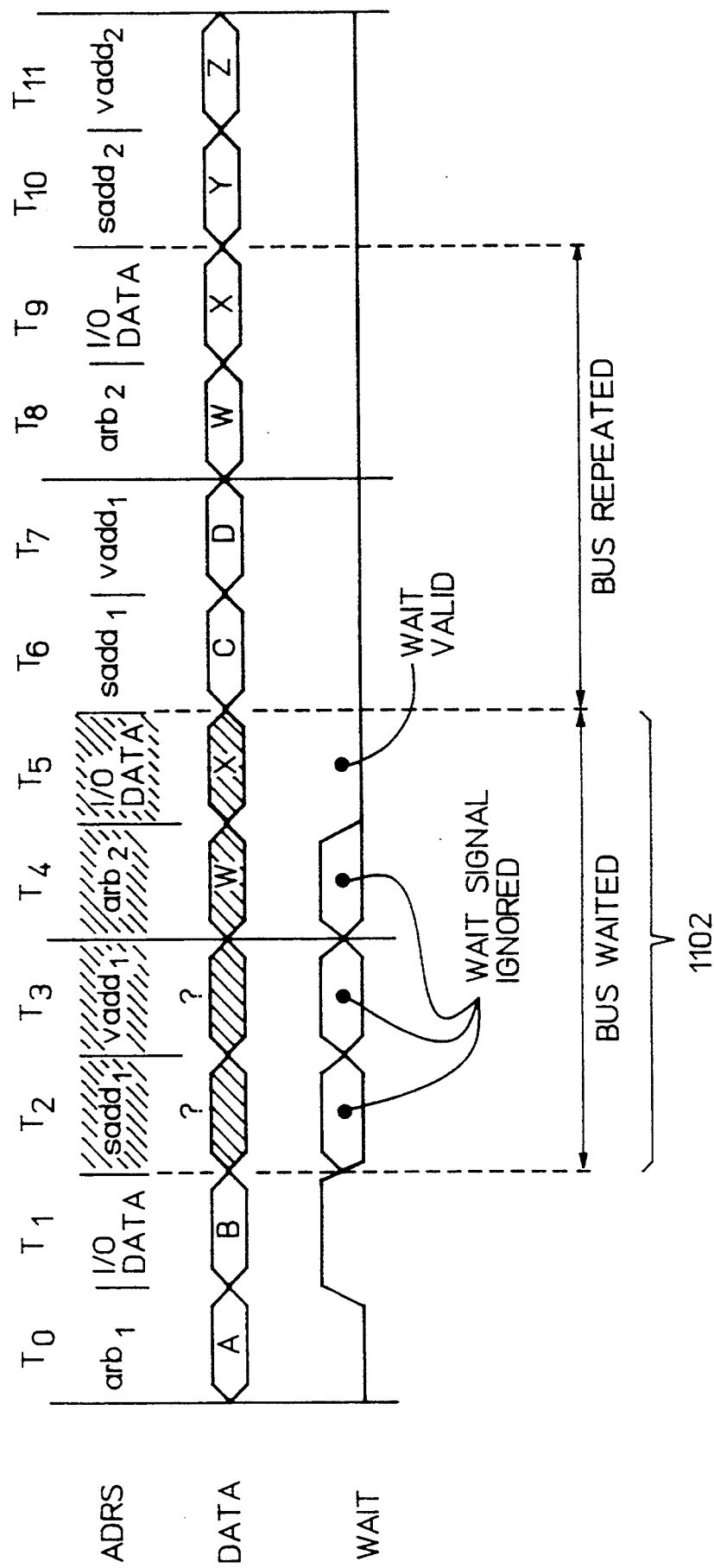
FIG. 13 is a bus timing diagram of the present invention with shadowed wait commands.

FIG. 13 shows a bus timing diagram where a wait command is asserted in four consecutive cycles, by multiple modules. A wait command can be asserted during any bus cycle. However, if a module asserts a wait command in cycle N, wait commands in cycles N+1, N+2, and N+3 have no effect. The wait commands asserted in the "shadow" of the first wait are ignored.

In the example shown in FIG. 13, the first wait command is asserted during bus cycle $T_1$ and therefore the wait commands asserted during $T_2$, $T_3$ and $T_4$, are ignored. The next bus cycle where a wait command is valid is bus cycle $T_5$. As the shadowed waits are ignored, the bus transactions occur as described above for FIG. 11.

Figure 14A:
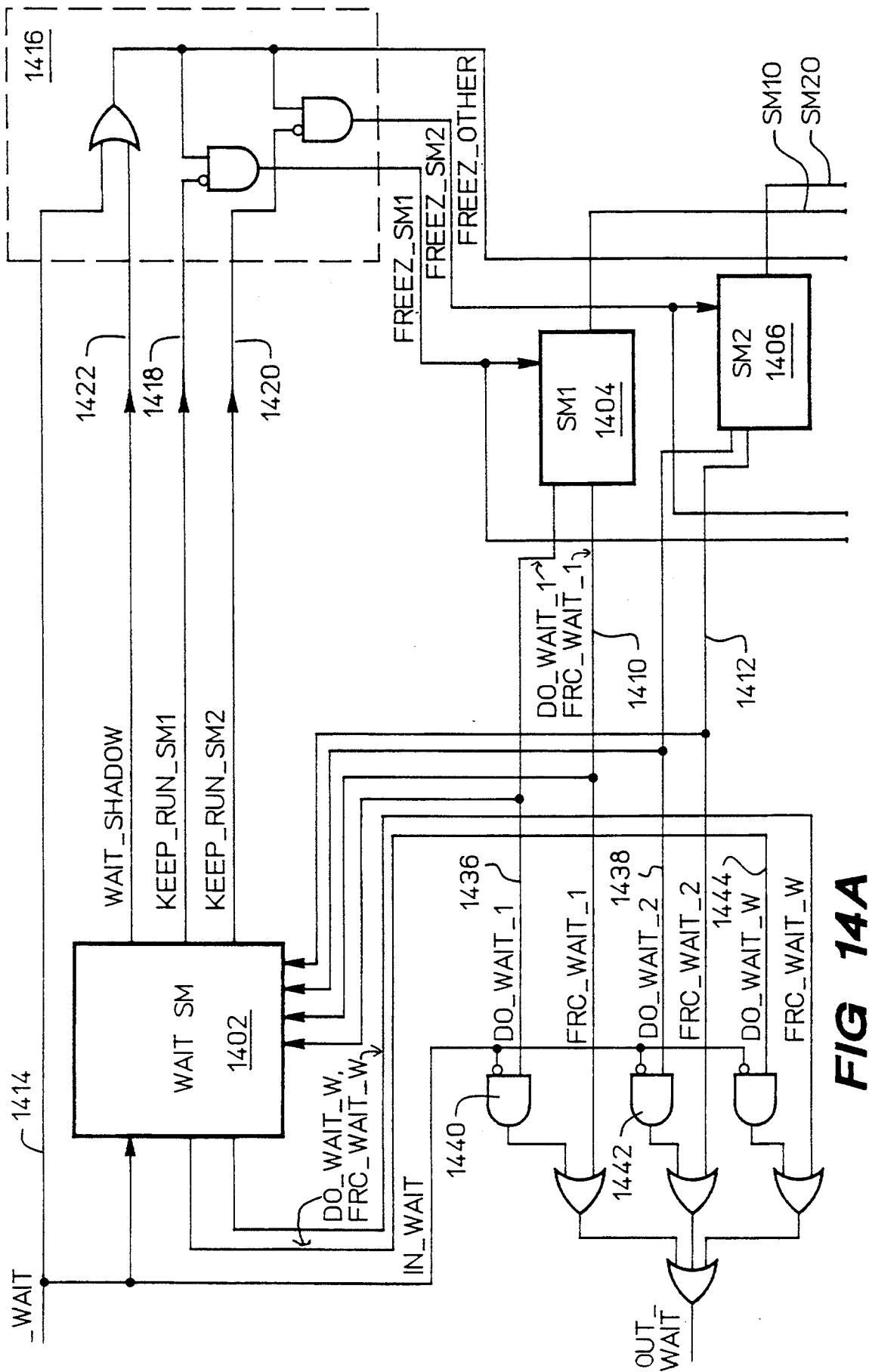
FIG. 14A and 14B form a detailed block diagram of a bus module according to the present invention.
Figure 14B:
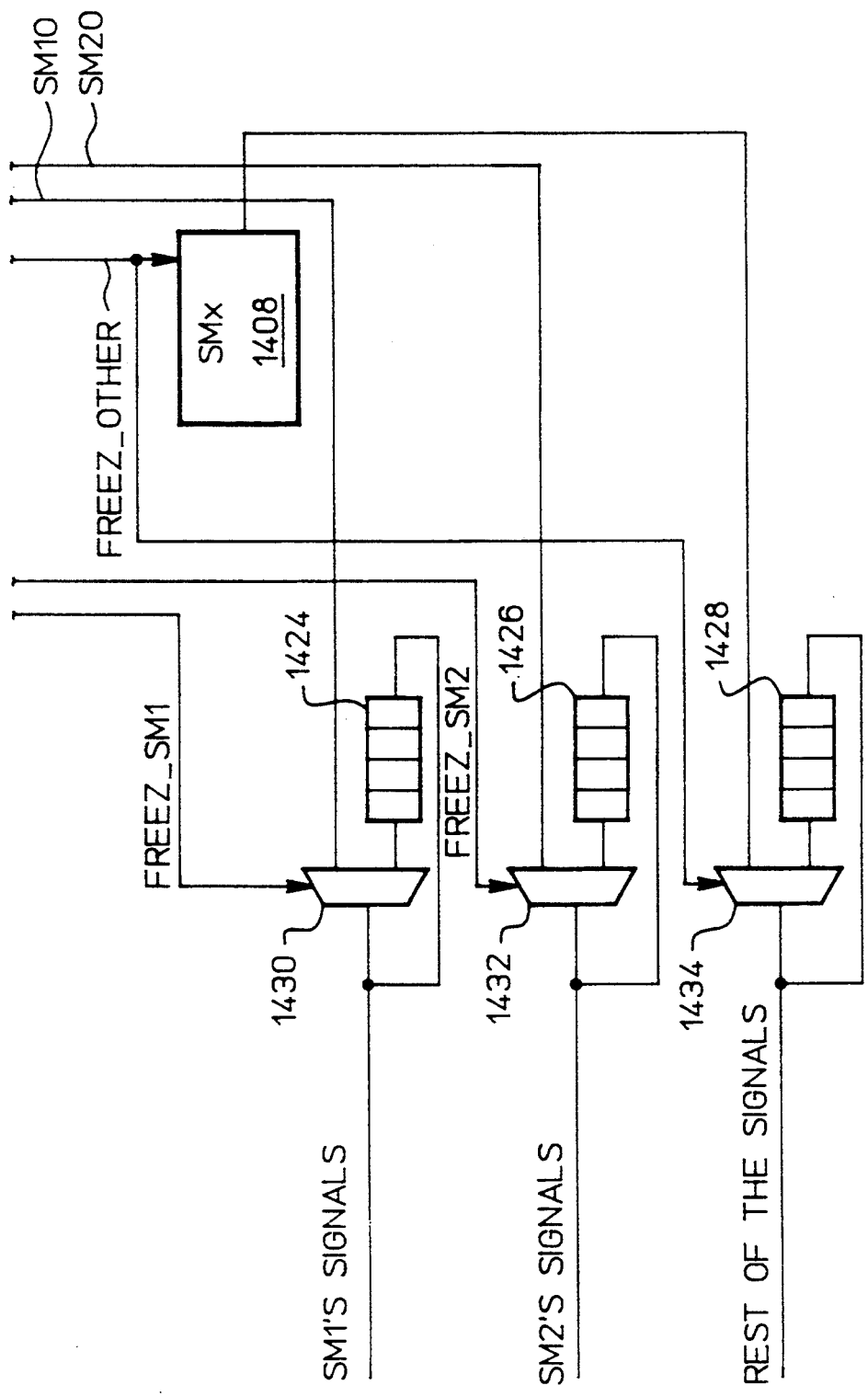
Figure 15:
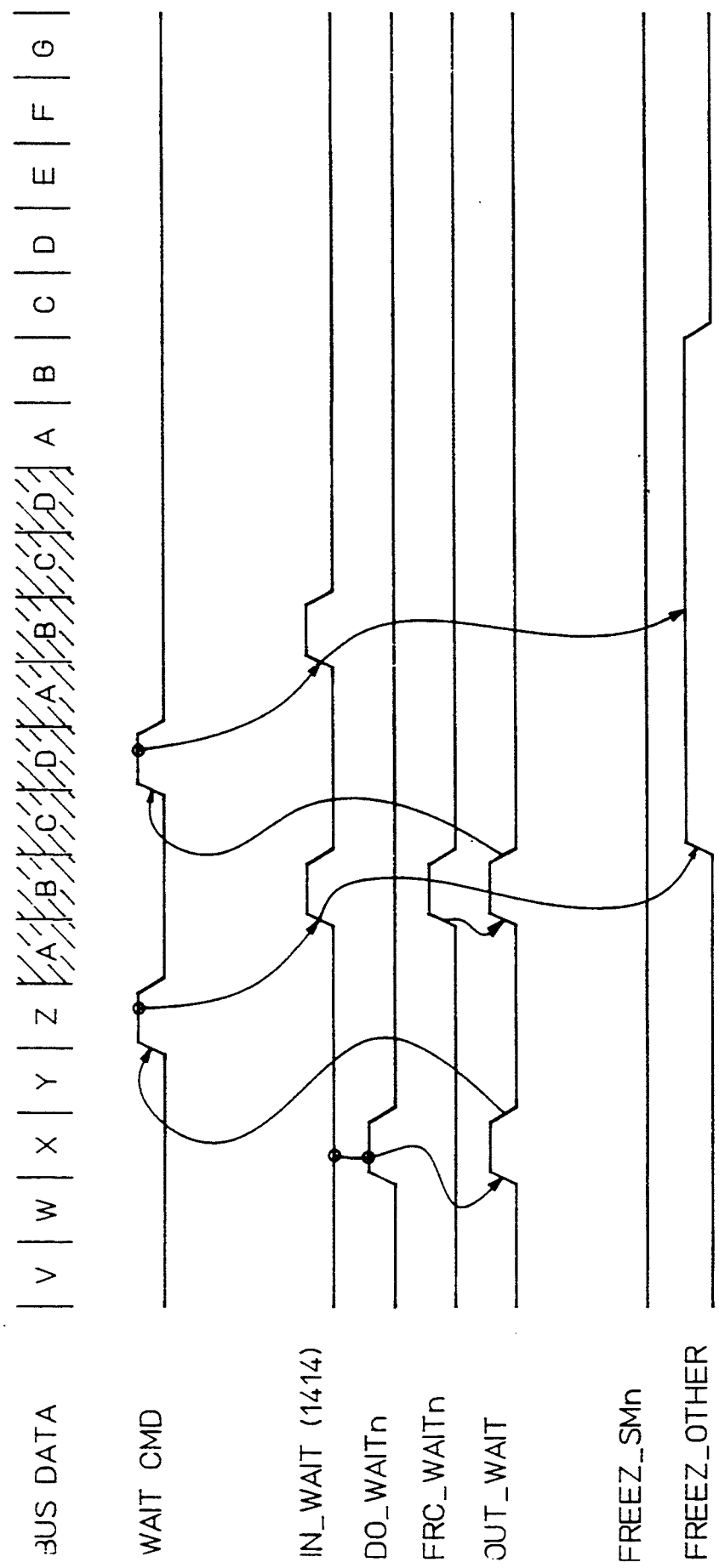
FIG. 15 is a timing diagram of a bus module shown in FIGS. 14A and 14B where the do_wait signal is not blocked.
Figure 16:
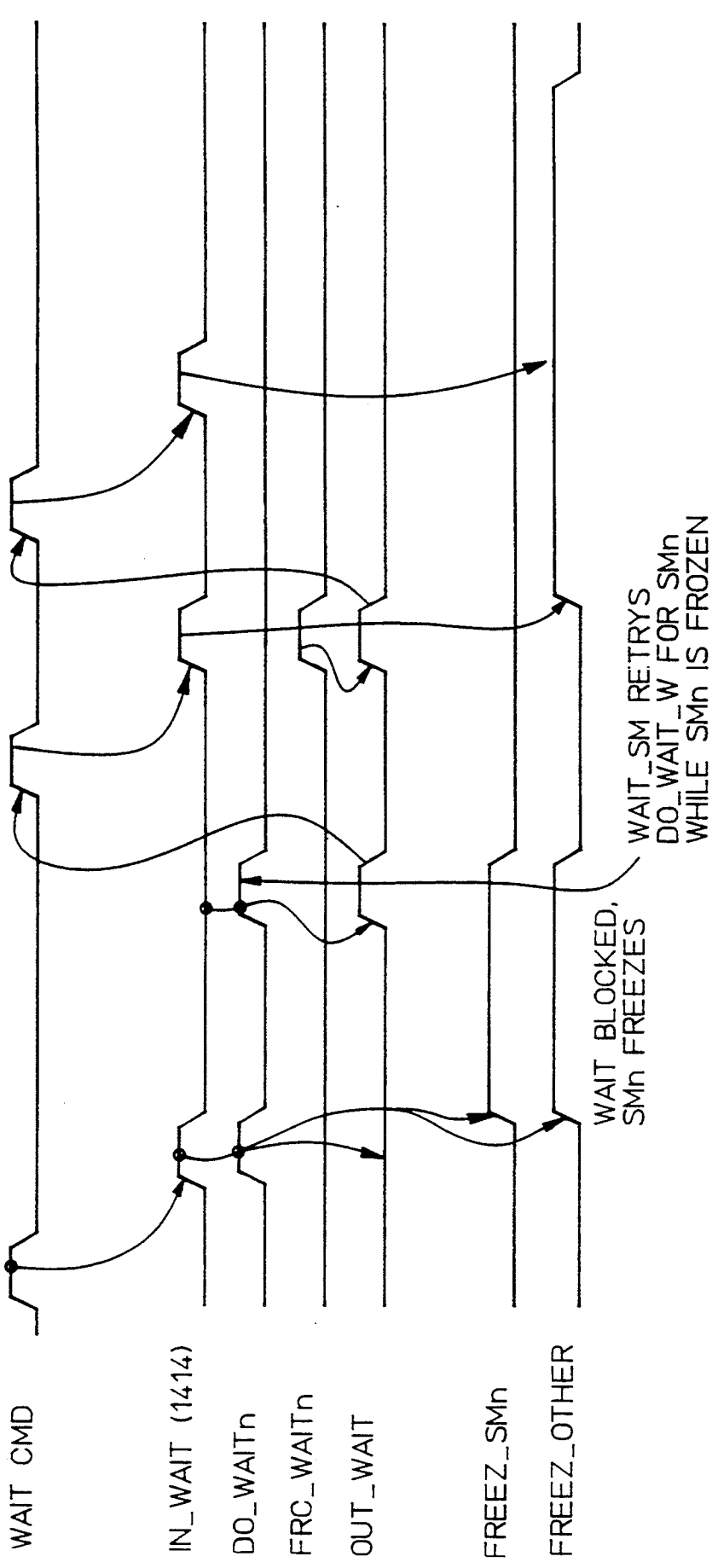
FIG. 16 is a timing diagram of a bus module shown in FIGS. 14A and 14B where the do_wait signal is blocked.

FIGS. 14A and 14B show the logic blocks internal to a bus module. Not shown are the receiving and driving transceivers shown in FIG. 9. FIGS. 15 and 16 are timing diagrams of the operation of the bus module, attempting to invalidate data "A" through "D", and are intended to aid the reader in understanding the following description. The bus module is controlled by several FSMs including a wait state machine (SM) 1402, a SM1 1404, a SM2 1406 and a SMx 1408. SM1, SM2, and SMx each drive non-overlapping subsets of the external bus (not shown). SM1 and SM2 sometimes need to wait the bus while SMx never does. To assert a wait command, SM1 asserts do_wait_1 1436, or SM2 asserts do_wait_2 1438 causing the external transceivers to assert a wait command on the bus two bus cycles later. Two bus cycles after the wait has been asserted on the bus, the bus module receivers receive the wait command and this signal propagates inside the module as in_wait 1414. In_wait goes through the combinatorial logic 1416 to immediately freeze SMx. SM1 and SM2 will also be frozen if they were not the original source of the wait command being asserted. The wait SM 1402 tracks whether SM1 or SM2 asserted a wait command four bus cycles ago. If one SM did assert a wait command, then signal keep_run_SM1 1418 or keep_run_SM2 1420 prevent that SM from freezing. Since a wait command causes 4 cycles of bus invalidation, the wait SM 1402 extends freeze_other by asserting wait_shadow 1422 for 3 more cycles after the initial in_wait signal.

The three replay queues 1424, 1426, and 1428 show various subsets of the external bus controlled by SM1, SM2 and SMx. When each SMn is frozen, the freeze_SMn signal selects one of the multiplexors 1430, 1432 or 1434 and thereby selects the replay queue for the bus signals controlled by that state machine. So while the particular state machine is frozen, the replay queue associated with that state machine will replay bus-bound data from 4 bus cycles ago. Each SM may run or freeze independently.

The reason SM1 and SM2 have two wait signals is to distinguish between two cases, the first being beginning a new wait period on the bus and the second being extending a wait period it caused. The first assertion of wait on the bus by a SMn must be qualified by the occurrence of a wait command on the bus four cycles earlier. If a wait command had been asserted on the bus four cycles earlier, then SMn(s) attempting to assert a wait command are blocked by in_wait so as not to extend a different SMn's or module's wait period. Once a SMn successfully achieves its own wait period, the SMn may want to lengthen its own wait period thereby waiting the bus for two or more wait periods.

The signal do_wait_n (1436 and 1438) is used by the SMn for the SMn's first attempt to assert a wait command and is sent to the wait SM 1402. The do_wait_n signals are anded by "and" gates 1440 and 1442 with the in_wait signal 1414 to prevent extending an existing wait period. If the do_wait signal is canceled by the in_wait signal, then the wait SM 1402 will re-assert a wait for the SMn by asserting its own version of the do_wait 1444 four cycles later. Once an SMn successfully asserts a wait command on the bus by either its own or the wait SM do_wait signal, it can extend the wait period for another four cycles by asserting frc_wait_n 1410 or 1412. The frc_wait_n signal is not gated and always causes a wait to be asserted on the bus.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. A digital computer apparatus of the type having a computer bus with separate data and address sections and the computer bus having bus cycles of time during which data is driven onto and read from the bus, comprising:

a data bus driver module for driving a sequence of data onto the data section of the computer bus and simultaneously storing the driven data in a data relay queue;

an address bus driver module for driving a sequence of data onto the address section of the computer bus and simultaneously storing the driven data in an address relay queque;

the data bus driver and the address bus driver modules operative to continue to drive the sequence of data on the respective sections of the computer bus simultaneously during a bus wait period associated with a wait command asserted by a bus module;

the data bus driver and the address bus driver modules operative to replay on the respective busses, after a determination of the bus wait period, the data stored in the respective replay queues; and data on the computer bus is pipelined such that data driven on the address section of the computer bus precedes, by at least one bus cycle, associated data driven on the data section of the computer bus.

2. An apparatus as in claim 1 wherein the address replay queue includes at least four storage locations.

3. An apparatus as in claim 1 wherein the data replay queue includes at least four storage locations.

4. An apparatus as in claim 1 wherein the wait command is asserted one bus cycle before the start of the bus wait period.

5. An apparatus as in claim 1 wherein the bus wait period includes at least four bus cycles.

6. An apparatus as in claim 1 wherein a driver bus module asserts a bus wait command one or more bus cycles before the bus wait period starts.

* * * * *

UNITED STATES PATENT AND TRADEMARK OFFICE
CERTIFICATE OF CORRECTION

PATENT NO. : 5,339,440
DATED : August 16, 1994
INVENTOR(S) : Edward M. Jacobs et al.

It is certified that error appears in the above-identified patent and that said Letters Patent is hereby corrected as shown below:

Column 10,
Line 17, delete "relay" and insert therefor -- replay --
Line 21, delete "relay queque" and insert therefor -- replay queue --

Signed and Sealed this

Twenty-first Day of June, 2005

JON W. DUDAS
*Director of the United States Patent and Trademark Office*